US011285660B2

(12) United States Patent
Soulestin et al.

(10) Patent No.: US 11,285,660 B2
(45) Date of Patent: Mar. 29, 2022

(54) METHOD OF MAKING RELAXOR FERROELECTRIC FLUOROPOLYMERS

(71) Applicants: ARKEMA FRANCE, Colombes (FR); CASE WESTERN RESERVE UNIVERSITY, Cleveland, OH (US)

(72) Inventors: Thibaut Soulestin, Lyons (FR); Lei Zhu, Cleveland, OH (US)

(73) Assignees: Arkema France, Colombes (FR); Case Western Reserve University, Cleveland, OH (US)

(*) Notice: Subject to any disclaimer, the term of this patent is extended or adjusted under 35 U.S.C. 154(b) by 0 days.

(21) Appl. No.: 16/612,733

(22) PCT Filed: May 12, 2017

(86) PCT No.: PCT/IB2017/000786
§ 371 (c)(1),
(2) Date: Nov. 11, 2019

(87) PCT Pub. No.: WO2018/206996
PCT Pub. Date: Nov. 15, 2018

(65) Prior Publication Data
US 2020/0061901 A1 Feb. 27, 2020

(51) Int. Cl.
B29C 55/00 (2006.01)
B29C 55/02 (2006.01)
C08F 214/22 (2006.01)
C08J 5/18 (2006.01)
B29K 27/12 (2006.01)
B29L 7/00 (2006.01)
B29L 31/00 (2006.01)

(52) U.S. Cl.
CPC ............ B29C 55/005 (2013.01); B29C 55/02 (2013.01); C08F 214/22 (2013.01); C08J 5/18 (2013.01); B29K 2027/12 (2013.01); B29L 2007/008 (2013.01); B29L 2031/731 (2013.01); C08J 2327/16 (2013.01)

(58) Field of Classification Search
None
See application file for complete search history.

(56) References Cited

U.S. PATENT DOCUMENTS

| 4,778,867 | A | * | 10/1988 | Preis | H01L 41/193 526/255 |
| 6,355,749 | B1 | | 3/2002 | Chung et al. | |
| 8,226,876 | B1 | * | 7/2012 | Hughes | B29C 43/003 264/331.14 |
| 2002/0090517 | A1 | * | 7/2002 | Zhang | H01G 4/18 428/421 |
| 2003/0052437 | A1 | * | 3/2003 | Ohigashi | H01L 41/45 264/235.6 |
| 2013/0296512 | A1 | * | 11/2013 | Marrani | C08F 214/22 526/209 |
| 2015/0307673 | A1 | * | 10/2015 | Domingues Dos Santos | C08F 214/222 526/249 |
| 2015/0325228 | A1 | * | 11/2015 | Choi | H01L 41/45 367/140 |
| 2016/0046746 | A1 | * | 2/2016 | Ameduri | C08F 214/22 526/255 |

FOREIGN PATENT DOCUMENTS

| JP | 2002513514 | 5/2002 |
| WO | WO 2007/078916 A2 | 7/2007 |
| WO | WO 2007/078916 A3 | 7/2007 |
| WO | WO 2008/090947 | 7/2008 |
| WO | WO 2017/051109 A1 | 3/2017 |

OTHER PUBLICATIONS

Bargain et al., "Semicrystalline Organization of VDF- and TrFE-Based Electroactive Terpolymers: Impact of the trans-1,3,3,3-Tetrafluoropropene Termonomer", Macromolecules, 2017, 10 pages.
Guan et al., "Crystal Orientation Effect on Electric Energy Storage in Poly(vinylidene fluoride-co-hexafluoropropylene) Copolymers," Macromolecules, vol. 43, No. 1, 2010, (p. 384-392).
Guan et al., "Effects of Polymorphism and Crystallite Size on Dipole Reorientation in Poly(vinylidene fluodie) and Its Random Copolymers," Macromolecules, vol. 43, No. 16, 2010, (p. 6739-6748).
International Search Report, re PCT Application No. PCT/IB2017/000786 dated Nov. 27, 2017, 4 pages.
PCT Notification of Transmittal of the International Search Report and the Written Opinion of the International Searching Authority, or the Declaration, re PCT Application No. PCT/IB2017/000786 dated Nov. 27, 2017, 1 page.
Petchsuk et al., "Synthesis and Electric Property of VDF/TrFE/HFP Terpolymers," Mat. Res. Soc. Symp. Proc. vol. 600, 2000 (p. 53-60).

(Continued)

Primary Examiner — Nicole M. Buie-Hatcher
(74) Attorney, Agent, or Firm — Knobbe, Martens, Olson & Bear, LLP

(57) ABSTRACT

This disclosure relates to a method of making a fluoropolymer object. The method may include
providing a substrate including fluoropolymer comprising units derived from monomers $M_1$, $M_2$ and $M_3$, wherein:
$M_1$ is a vinylidene fluoride;
$M_2$ is a monomer of formula (I): $CX_1X_2\!=\!CX_3X_4$, wherein each of $X_1$, $X_2$, $X_3$ and $X_4$ is independently selected from H, Cl and F, and wherein at least one of $X_1$, $X_2$, $X_3$ and $X_4$ is F;
$M_3$ is a monomer of formula (II): $CY_1Y_2\!=\!CY_3CF_3$, wherein each of $Y_1$, $Y_2$ and $Y_3$ is independently selected from H, Cl, F, Br, I and alkyl groups comprising from 1 to 3 carbon atoms which are optionally partly or fully halogenated; and
stretching the substrate.

16 Claims, 1 Drawing Sheet

(56) References Cited

OTHER PUBLICATIONS

Written Opinion of the International Searching Authority, re PCT Application No. PCT/IB2017/000786 dated Nov. 27, 2017, 6 pages.
Xu et al., "Structural and ferroelectric response in vinylidene fluoride/ trifluoroethylene/hexafluoropropylene terpolymers," Polymer 48, 2007, (p. 2124-2129).
Zhu, Lei., "Processing Induced Novel Relaxor Ferroelectric Behavior in a P(VDF-TrFE-HFP) Random Terpolymer" PowerPoint, Oct. 3, 2019, 18 pages.
Zhu, Lei. Stretching-Induced Novel Relaxor Ferroelectric Behavior in a P(VDF-TrFE-HFP) Random Terpolymer. Mar. 15, 2017. PowerPoint Presentation, in 15 pages.
Zhu et al., "Stretching-Induced Novel Relaxor Ferroelectric Behavior in a Poly(vinylidene fluoride-\textit{co}-trifluoroethylene-\textit{co}-hexafluoropropylene) Random Terpolmer," APS March Meeting 2017, vol. 62, No. 4, in 1 page. Abstract.
Guan et al., "Effects of film processing conditions on electric energy storage for pulsed power applications", IEEE Transactions on Dielectrics and Electrical Insulation, IEEE Service Center, Piscataway, NJ, US, vol. 18, No. 4, Aug. 1, 2011 (Aug. 1, 2011), pp. 1293-1300.

\* cited by examiner

METHOD OF MAKING RELAXOR FERROELECTRIC FLUOROPOLYMERS

TECHNICAL FIELD

The present invention relates to a method of making fluoropolymer-based films or similar objects by stretching an initial fluoropolymer substrate.

TECHNICAL BACKGROUND

Relaxor ferroelectric (RFE) polymers exhibiting narrow hysteresis loops are attractive for a broad range of potential applications such as electric energy storage, artificial muscles, electrocaloric cooling and printable electronics. Current state-of-the-art RFE polymers are primarily P(VDF-TrFE-X), i.e. poly(vinylidene fluoride-ter-trifluoroethylene-ter-X), random terpolymers wherein X is 1,1-chlorofluoroethylene (CFE) or chlorotrifluoroethylene (CTFE).

It is believed that the incorporation of relatively small quantities of a chlorinated monomer into a P(VDF-TrFE)-based copolymer modifies the semi-crystalline structure of the polymer, making it possible to achieve RFE properties. In this respect, reference may be made inter alia to document U.S. Pat. No. 6,355,749.

On the other hand, no relaxor ferroelectric behavior was observed with other copolymers or terpolymers, and notably with P(VDF-TrFE-X) terpolymers, where X is a $CF_3$ group-containing monomer. Reference may be made in this respect to Xu et al. in *Polymer* 2007 (DOI: 10.1016/j.polymer.2007.02.035), which discusses ferroelectric properties of P(VDF-TrFE-HFP) terpolymers, wherein HFP stands for hexafluoropropene. Reference may also be made to Bargain et al. in *Macromolecules* 2017 (DOI: 10.1021/acs.macromol.7b00051), which discusses the semi-crystalline organization of P(VDF-TrFE-1234ze) terpolymers, wherein 1234ze stands for 1,3,3,3-tetrafluoropropene.

Stretching films made of some fluoropolymers such as P(VDF-HFP) copolymers is known from the art, but no relaxor ferroelectric behavior was obtained as a result of said stretching. Reference may be made in this respect to Guan et al. in *Macromolecules* 2010 (DOI: 10.1021/ma101062j) and Guan et al. in *Macromolecules* 2010 (DOI: 10.1021/ma901921h).

There is still a need to provide further fluoropolymer films or other similar objects having relaxor ferroelectric properties, based on further monomers.

SUMMARY OF THE INVENTION

It is a first object of the invention to provide a method of making a fluoropolymer object, comprising:
  providing a substrate made of a fluoropolymer comprising units derived from monomers $M_1$, $M_2$ and $M_3$, wherein:
    $M_1$ is vinylidene fluoride;
    $M_2$ is a monomer of formula (I): $CX_1X_2=CX_3X_4$, wherein each of $X_1$, $X_2$, $X_3$ and $X_4$ is independently selected from H, Cl and F, and wherein at least one of $X_1$, $X_2$, $X_3$ and $X_4$ is F;
    $M_3$ is a monomer of formula (II): $CY_1Y_2=CY_3CF_3$, wherein each of $Y_1$, $Y_2$ and $Y_3$ is independently selected from H, Cl, F, Br, I and alkyl groups comprising from 1 to 3 carbon atoms which are optionally partly or fully halogenated;
  stretching the substrate.

In some embodiments, the fluoropolymer object is a fluoropolymer film or a fluoropolymer fiber.

In some embodiments, the substrate is stretched at a temperature higher than the glass transition temperature of the fluoropolymer of the substrate and preferably higher than the Curie transition temperature of the fluoropolymer of the substrate.

In some embodiments, the substrate is stretched at a temperature from 20 to 120° C., preferably from 30 to 110° C., more preferably from 40 to 100° C.

In some embodiments, the substrate is stretched by at least 150%, preferably by at least 200%, or by at least 300%, or by at least 400%.

In some embodiments, the substrate is stretched in one direction; or is stretched in at least two directions.

In some embodiments, $M_2$ is selected from trifluoroethylene, tetrafluoroethylene, chlorotrifluoroethylene and 1,1-chlorofluoroethylene and preferably is trifluoroethylene.

In some embodiments, each of $Y_1$, $Y_2$ and $Y_3$ is independently selected from H, Cl, F, Br and I, and more preferably is independently selected from H, Cl and F.

In some embodiments, $M_3$ is selected from hexafluoropropene, 3,3,3-trifluoropropene, 1,3,3,3-tetrafluoropropene, 2,3,3,3-tetrafluoropropene, 1-chloro-3,3,3-trifluoropropene and 2-chloro-3,3,3-trifluoropropene.

In some embodiments, the proportion of units derived from the $M_1$ monomers in the fluoropolymer is from 15 to 55 mol. %, preferably from 25 to 45 mol. %, relative to the total of units derived from the $M_1$ and $M_2$ monomers.

In some embodiments, the fluoropolymer comprises less than 15 mol. %, preferably less than 10 mol. %, of units derived from the $M_3$ monomers.

In some embodiments, providing the substrate comprises shaping the fluoropolymer into the substrate, preferably by extruding or hot-pressing the fluoropolymer into the substrate.

In some embodiments, providing the substrate also comprises a preliminary step of manufacturing the fluoropolymer by polymerizing monomers $M_1$, $M_2$ and $M_3$.

The invention also relates to the fluoropolymer object obtained (or obtainable) from the above-described method.

The invention also relates to an electronic device comprising the above-described fluoropolymer object.

In some embodiments, the fluoropolymer object is present as a layer in the device.

In some embodiments, the electronic device is selected from field-effect transistors, transducers, haptic devices and electromechanical microsystems.

The present invention addresses the need expressed in the prior art. In particular, the invention provides fluoropolymer films or other similar objects having relaxor ferroelectric properties, based on other monomer combinations than VDF, TrFE and CFE, or than VDF, TrFE and CTFE.

More particularly, the invention provides fluoropolymer films or other similar objects based on terpolymers comprising units (i.e. polymerized units) derived from VDF and a $CF_3$ group-containing monomer, such as HFP for example.

This is made possible owing to the surprising finding that stretching films or other similar objects based on such terpolymers modifies their ferroelectric properties and imparts a relaxor ferroelectric behavior.

DESCRIPTION OF EMBODIMENTS

Figure 1:
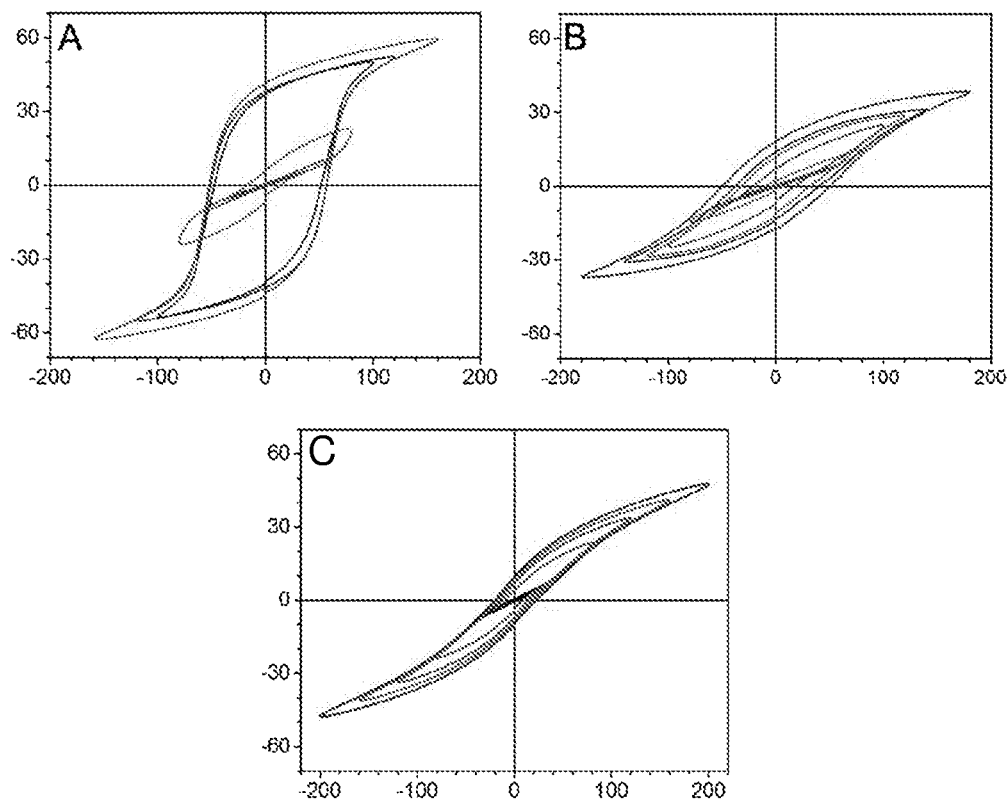
In FIG. 1, polarization curves are shown for three polymer films A, B and C as set forth in detail in example 2 below. Polarization in $mC/m^2$ is shown on the Y-axis and the applied electric field in MV/m is shown on the X-axis.

The invention will now be described in more detail without limitation in the following description.

The invention relies on the use of a fluoropolymer comprising units derived from monomers $M_1$, $M_2$ and $M_3$. In other words, the polymer is obtained by the polymerization of monomers $M_1$, $M_2$ and $M_3$ (and optionally further monomers, as described below).

Monomers $M_1$, $M_2$ and $M_3$ are different.

Monomers $M_1$ are vinylidene fluoride monomers.

Monomers $M_2$ are monomers of formula (I): $CX_1X_2=CX_3X_4$, wherein each of $X_1$, $X_2$, $X_3$ and $X_4$ is independently selected from H, Cl and F, and wherein at least one of $X_1$, $X_2$, $X_3$ and $X_4$ is F.

Monomers $M_3$ are monomers of formula (II): $CY_1Y_2=CY_3CF_3$, wherein each of $Y_1$, $Y_2$ and $Y_3$ is independently selected from H, Cl, F, Br, I or is an alkyl group comprising from 1 to 3 carbon atoms which is optionally partly or fully halogenated.

Mixtures of different monomers can be used, both for $M_2$ and for $M_3$. Besides, units derived from yet further monomers may be present in the fluoropolymer. In such a case, the overall proportion of such units derived from yet further monomers in the fluoropolymer is preferably less than 5 mol. %, more preferably less than 2 mol. % or less than 1 mol. %.

Most preferably, the fluoropolymer of the invention consists essentially, or ideally consists, of units derived from monomers $M_1$, $M_2$ and $M_3$.

Besides, most preferably, use is made of a single monomer $M_2$ and a single monomer $M_3$, which means that the fluoropolymer is a terpolymer.

$M_2$ is preferably selected from vinyl fluoride, trifluoroethylene, tetrafluoroethylene, chlorotrifluoroethylene and 1,1-chlorofluoroethylene. More preferably, $M_2$ is trifluoroethylene.

Accordingly, in preferred variations, the fluoropolymer of the invention is a P(VDF-TrFE-$M_3$) terpolymer, wherein $M_3$ is as defined above.

Monomer $M_3$ may preferably comprise from 3 to 6 carbon atoms. More preferably, monomer $M_3$ comprises 3 carbon atoms.

In preferred variations, each of $Y_1$, $Y_2$ and $Y_3$ in formula (II) is independently selected from H, Cl, F, Br and I, and more preferably is independently selected from H, Cl and F.

In other preferred variations, each of $Y_1$, $Y_2$ and $Y_3$ in formula (II) is independently selected from H, F, and alkyl groups comprising from 1 to 3 carbon atoms which are optionally partly or fully fluorinated.

In other preferred variations, each of $Y_1$, $Y_2$ and $Y_3$ in formula (II) is independently selected from H and F.

In some variations, the fluoropolymer does not comprise any chlorine atom. Potential dehydrochlorination at elevated temperatures can prevent the melt-processing of chlorine-containing terpolymers. It is therefore particularly advantageous to achieve an RFE behavior for chlorine-free fluoropolymers.

Preferred monomers $M_3$ are hexafluoropropene (HFP), 3,3,3-trifluoropropene, 1,3,3,3-tetrafluoropropene (1234ze), 2,3,3,3-tetrafluoropropene (1234yf), 1-chloro-3,3,3-trifluoropropene (1233zd) and 2-chloro-3,3,3-trifluoropropene (1233xf).

HFP and 1234ze are even more preferred.

HFP is most preferred.

The proportion of units derived from monomers $M_2$ is preferably from 5 to 95 mol. % relative to the total of units derived from monomers $M_1$ and $M_2$ in the fluoropolymer. More preferably it can be: from 5 to 10 mol. %; or from 10 to 15 mol. %; or from 15 to 20 mol. %; or from 20 to 25 mol. %; or from 25 to 30 mol. %; or from 30 to 35 mol. %; or from 35 to 40 mol. %; or from 40 to 45 mol. %; or from 45 to 50 mol. %; or from 50 to 55 mol. %; or from 55 to 60 mol. %; or from 60 to 65 mol. %; or from 65 to 70 mol. %; or from 70 to 75 mol. %; or from 75 to 80 mol. %; or from 80 to 85 mol. %; or from 85 to 90 mol. %; or from 90 to 95 mol. %. Ranges of from 15 to 55 mol. % and more particularly from 25 to 45 mol. % are preferred.

The proportion of units derived from monomers $M_3$ in the fluoropolymer (relative to all units) is preferably from 0.5 to 1 mol. %; or from 1 to 2 mol. %; or from 2 to 3 mol. %; or from 3 to 4 mol. %; or from 4 to 5 mol. %; or from 5 to 6 mol. %; or from 6 to 7 mol. %; or from 7 to 8 mol. %; or from 8 to 9 mol. %; or from 9 to 10 mol. %; or from 10 to 12 mol. %; or from 12 to 15 mol. %; or from 15 to 20 mol. %. Proportions of less than 15 mol. % and more particularly less than 10 mol. % are preferred.

The molar composition of the fluoropolymer of the invention can be determined by various methods. Conventional methods for the elemental analysis of carbon, fluorine and chlorine or bromine elements result in a system of two or three independent equations comprising two independent unknowns for a terpolymer (% VDF and % $M_2$, with % $M_3$=100-(% VDF+% $M_2$)), which makes it possible to unambiguously calculate the composition by weight of the polymers, from which the molar composition is deduced.

It is also possible to employ multinuclear NMR techniques, such as proton (1H) and fluorine (19F) NMR, and to analyze a solution of the fluoropolymer in an appropriate deuterated solvent. The NMR spectrum is recorded on an FT-NMR spectrometer equipped with a multinuclear probe. Specific signals resulting from different monomers in the produced spectra are then identified. For example, TrFE units result, in proton NMR, in a specific signal characteristic of the CFH group (at approximately 5 ppm). The same applies to the $CH_2$ groups of VDF units (unresolved peak centered at 3 ppm). The relative integration of the two signals gives access to the relative abundance of the two monomers, that is to say the VDF/TrFE molar ratio.

Similarly, a $CF_3$ group results in a characteristic and well-isolated signal in fluorine NMR. The combination of the relative integrations of the different signals obtained in proton NMR and in fluorine NMR results in a system of equations, the solution of which provides the molar concentrations of the different monomer units in the fluoropolymer.

Finally, it is possible to combine the elemental analysis, for example for heteroatoms such as chlorine or bromine, and the NMR analysis.

The fluoropolymer of the invention is preferably a statistical (random), linear polymer.

Preferably, it is thermoplastic and substantially not elastomeric (i.e. it is not a fluoroelastomer).

The fluoropolymer may be homogenous or heterogenous. A homogenous polymer has a uniform chain structure, that is the statistic distribution of units derived from various monomers does substantially not vary between the chains. In a heterogenous polymer, the distribution of units derived from the various monomers in the chains is multimodal or spread out. A heterogenous polymer thus comprises chains which contain more units of a certain kind, and other chains which contain fewer units of this kind. An example of heterogenous polymer can be found in document WO 2007/080338.

The fluoropolymer may be prepared using any known polymerization process, such as emulsion polymerization, suspension polymerization and solution polymerization.

In some variants, a process similar to that disclosed in document WO 2010/116105 may be used. This process makes it possible to obtain polymers of high molecular weight and of a suitable structure.

In short, this process may comprise the following steps:
- loading an initial mixture of $M_1$ and $M_2$ (without $M_3$) to a stirred autoclave containing water;
- heating the autoclave to a predetermined temperature close to the polymerization temperature;
- injecting a radical polymerization initiator mixed with water into the autoclave, in order to achieve a pressure in the autoclave which is preferably at least 80 bar and to form a suspension of $M_1$ and $M_2$ in water;
- injecting a second mixture of $M_1$, $M_2$ and $M_3$ into the autoclave;
- as soon as the polymerization reaction begins, continuously injecting said second mixture into the autoclave reactor, in order to maintain the pressure at an essentially constant level, preferably of at least 80 bar.

The initial mixture advantageously comprises only $M_1$ and $M_2$ in a proportion equal to the desired composition of the final fluoropolymer. The second mixture advantageously has a composition which is adjusted so that the total composition of monomers introduced into the autoclave, including the initial mixture and the second mixture, is equal to or approximately equal to the desired composition of the final fluoropolymer.

The ratio by weight of the second mixture to the initial mixture is preferably from 0.5 to 2, more preferably from 0.8 to 1.6.

The implementation of this process with an initial mixture and a second mixture makes the process independent of the initiation of the reaction, which is often unpredictable. The polymers thus obtained are in the form of a powder, without crust or skin.

The pressure in the autoclave reactor is preferably from 80 to 110 bar, and the temperature is maintained at a level preferably of 40° C. to 60° C.

The second mixture can be continuously injected into the autoclave. It can be compressed before being injected into the autoclave, for example by using a compressor or two successive compressors, generally to a pressure greater than the pressure in the autoclave.

In other variants, all monomers $M_1$, $M_2$ and $M_3$ may be introduced into the reactor from the start, in a batch process. This is especially the case when no CFE or CTFE is used, and for instance for P(VDF-TrFE-HFP) and P(VDF-TrFE-1234ze) polymers. In this context, a process similar to those disclosed in WO 2017/051109 may for instance be used.

Accordingly, the fluoropolymer may be prepared by solution radical polymerization in the presence of a radical initiator in a solvent.

The reactant mixture may be heated up to a reaction starting temperature of from 30 to 100° C. and preferably from 40 to 80° C. Initial pressure within the autoclave may vary depending on the solvent, reaction temperature and the amount of monomers. It is generally from 0 to 80 bar. The selection of an optimal temperature depends on the initiator which is used. Generally, the reaction may be performed during at least 6 hours, at a temperature at which the initiator's half-life is from 1 to 10 hours.

Alternatively, the fluoropolymer may be prepared by suspension radical polymerization, in the presence of water, a radical initiator, optionally a dispersion agent and optionally a chain transfer agent. This makes it possible to avoid using toxic solvents and fluorinated surfactants during the synthesis.

All monomers may be introduced into the reactor from the start into the reactor. The reactor may then be brought to the desired initiating temperature, which is maintained during polymerization at a temperature of from 40 to 60° C. Then the initiator is injected into the reactor so that polymerization can start. Pressure tends to decrease as a result of monomer consumption, which is compensated by a continuous supply of water. The pressure can thus be maintained in a range of e.g. from 80 to 110 bar. The reactor can then be cooled down and degassed, and the product can be collected in the form of a suspension which can be filtered.

In the various processes described above, the radical initiator may for instance be tert-butyl peroxypivalate (TBPPI), tert-amyl peroxypivalate, peroxydicarbonates such as bis(4-tert-butyl cyclohexyl)peroxydicarbonate, sodium or di(n-alkyl) peroxydicarbonate, ammonium or potassium persulfates, benzoyl peroxide and its derivatives, tert-butyl hydroxyperoxide, tert-butyle peroxide or 2,5-bis(tert-butylperoxy)-2,5-dimethylhexane. It can generally be used in an amount of 0.1 to 10 g per kilogram of total load of monomers. Preferably, the amount used is from 0.5 to 5 g/kg.

The solvent, if present, may for instance be selected from 1,1,1,3,3-pentafluorobutane, acetonitrile, methylethylketone, dimethyl carbonate, 2,2,2-trifluoroethanol, hexafluoroisopropanol, methyl acetate, ethyl acetate, cyclohexanone and mixtures thereof.

The dispersion agent, if present, may be selected from e.g. aqueous soluble cellulosic derivatives, such as alkyl celluloses or alkyl hydroxyalkyl celluloses, paraffin and polyvinyl alcohols.

A chain transfer agent may be included in order to better control the molecular weight of the fluoropolymer. It can for instance be selected from alkyl acetates such as ethyl acetate, bisalkyl carbonates such as diethyl carbonate, ketones such as butanone-2, thiols, alkyl halides, saturated alcohols such as isopropanol and alkanes such as propane.

Once the fluoropolymer has been synthesized it can be washed and dried.

The weight average molecular weight of the fluoropolymer is preferably at least 100,000 g·mol$^{-1}$, more preferably at least 200,000 g·mol$^{-1}$, even more preferably 300,000 g·mol$^{-1}$, and most preferably at least 400,000 g·mol$^{-1}$. It can be adjusted by modifying some parameters of the polymerization process, such as the reaction temperature, or by using a chain transfer agent as described above.

The molecular weight distribution may be evaluated by size exclusion chromatography with N,N-dimethylformamide as an eluent, with a set of three columns of increasing porosity. The stationary phase is a styrene-divinylbenzene gel. Detection relies on the measurement of the refraction index, and calibration is performed with polystyrene standards. The sample is put in solution at 0.5 g/L in dimethylformamide and filtered on a nylon filter of 0.45 µm.

According to the invention, the polymer is shaped into a substrate (or initial object). Then said substrate is stretched so as to form a (final) object.

The substrate is preferably a film. Alternatively, it can be a fiber or a set of fibers.

The film may have an average thickness of from 1 to 100 µm, preferably from 2 to 60 µm. Fibers may have an average diameter of from 1 to 100 µm, preferably from 2 to 60 µm.

A film of fluoropolymer may be made by suspending or dissolving the fluoropolymer in a liquid vehicle so as to form an ink, and subsequently depositing a layer of ink on a surface and evaporating the liquid vehicle.

The liquid vehicle is preferably a solvent. More preferably, it is selected from dimethylformamide, dimethylacetamide, dimethylsulfoxide, ketones, such as acetone, methylethylketone, methylisobutylketone and cyclopentanone, furans, such as tetrahydrofurane, esters, such as methyl acetate, ethyl acetate, propyl acetate, butyl acetate and propylene glycol methyl ether acetate; carbonates, such as dimethylcarbonate, phosphates, such as 1e triethylphosphate. Mixtures of these compounds may also be used.

The total weight concentration of fluoropolymer in the liquid vehicle may in particular be from 0.1 to 30%, preferably from 0.5 to 20%.

The ink may optionally comprise one or more additives, for instance selected from surfactants, rheology modifiers, ageing resistance agents, pigments or dyes, fillers (including nanofillers), or any residual additives used for synthesizing the fluoropolymer.

The ink may in particular be deposited on a glass surface or silicon surface or polymer surface or metal surface. Said deposition may be performed notably by spin-coating, spray coating, bar coating, dip coating, roll-to-roll printing, serigraphy printing, lithography printing or ink-jet printing.

Alternatively, and more preferably, the film may be formed, without using an ink, by hot pressing a powder of fluoropolymer between two plates. Hot pressing may comprise sandwiching the powder between two films such as polyimide films (notably Kapton® films) and heating the resulting sandwich between unclosed hot platens. The heating may be performed at a temperature of e.g. from 150 to 250° C., at a pressure of e.g. from 1000 to 7000 psi, preferably from 2000 to 6000 psi and more preferably from 3000 to 5000 psi. The heated sandwich may be kept under pressure for a duration of e.g. from 1 to 30 min, preferably from 2 to 15 min and more preferably from 3 to 10 min. Degassing may be performed notably prior to said pressing, by repeated compression and release, in order to avoid trapping air bubbles in the film. After holding under pressure, the film can be quenched e.g. into liquid nitrogen to prevent the formation of large crystallites.

Alternatively, the film may be formed by extrusion e.g. by melting a powder of fluoropolymer at a temperature of from 150 to 250° C. and extruding it through an extruding die.

Fibers may also be formed by extrusion or by electrospinning. Electrospinning may for example be performed as described in the article by Zhong et al. in *Polymer* 2011, 52:2228-2237.

The substrate thus formed is subsequently stretched. The stretching step may in particular be performed by inserting the film between two rolls rotating at different speeds.

The temperature at which the stretching is performed is preferably higher than the glass transition temperature of the fluoropolymer.

The temperature at which the stretching is performed is preferably higher than the Curie transition temperature of the fluoropolymer (at an electric frequency of 1 kHz).

Accordingly, the temperature at which the stretching is performed is preferably from 20 to 120° C., more preferably from 30 to 110° C., even more preferably from 40 to 100° C. Possible temperature ranges which are typically appropriate for performing said stretching may be from 20 to 30° C., or from 30 to 40° C., or from 40 to 50° C., or from 50 to 60° C., or from 60 to 70° C., or from 70 to 80° C., or from 80 to 90° C., or from 90 to 100° C., or from 100 to 110° C., or from 110 to 120° C.

The stretching ratio is preferably at least 150%, more preferably at least 200%, or 250%, or 300%, or 350%, or 400%.

For a film, the stretching ratio corresponds to the ratio between the surface of the film after stretching and the surface of the film before stretching.

For a fiber or a set of fibers, the stretching ratio corresponds to the ratio between the length of the fibers after stretching and the length of the fibers before stretching.

If the substrate is a film, the stretching may be performed in one direction (uniaxial stretching) or more than one direction (e.g. biaxial stretching), in one or several successive stages.

After the stretching step, the fluoropolymer object may be subjected to a post-treatment step, such as a thermal annealing step. However, in a preferred variation, no post-treatment and in particular no thermal annealing is performed. In particular, it has been found that thermal annealing is unnecessary when the stretching is performed at a sufficiently high temperature.

When the stretching is performed at a relatively low temperature, below the Curie transition temperature, a thermal annealing step of the film with fixed ends is preferably performed, above the Curie transition temperature, so as to stabilize RFE properties. Accordingly, the temperature at which the thermal annealing step is performed is preferably from 20 to 120° C., more preferably from 30 to 110° C., even more preferably from 40 to 100° C. Possible temperature ranges which are typically appropriate for performing said thermal annealing step may be from 20 to 30° C., or from 30 to 40° C., or from 40 to 50° C., or from 50 to 60° C., or from 60 to 70° C., or from 70 to 80° C., or from 80 to 90° C., or from 90 to 100° C., or from 100 to 110° C., or from 110 to 120° C. Thermal annealing with fixed ends implies that changes in the film dimensions is prevented during said thermal annealing.

Thermal annealing with free ends is undesirable especially if the film was stretched at a temperature lower than the Curie transition temperature, as the RFE behavior may then be lost.

The fluoropolymer object obtained as described above is preferably characterized by one or more, preferably all, of the following parameters:
- coercive field of less than 60 MV/m and more preferably of less than 40 MV/m (at an applied electric field having a frequency of 10 Hz and a magnitude of 150 MV/m);
- a Curie transition temperature which varies depending on the electric field frequency;
- a Curie transition temperature which is less than 80° C., preferably less than 70° C., or less than 60° C., and more preferably from 10 to 60° C., at an electric field frequency of 1 kHz;
- a dielectric constant at 25° C. and at an electric field frequency of 1 kHz which is at least 10, preferably at least 13;
- a dielectric constant at the Curie transition temperature and at an electric field frequency of 1 kHz which is at least 20, preferably at least 25 and more preferably at least 30.

The stretching step preferably results in a decrease in the coercive field. Accordingly, the coercive field before stretching is preferably more than 40 MV/m while the coercive field after stretching is preferably less than 40 MV/m.

Before the stretching step, the substrate preferably has a Curie transition temperature which is substantially constant with respect to the electric field frequency, whereas the Curie transition temperature becomes dependent on the electric field frequency after the stretching step. A Curie transition temperature which varies depending on the electric field frequency is characteristic of a relaxor-ferroelectric material.

The coercive field may be determined based on a D-E hysteresis loop measurement, using the following exemplary protocol: a Premiere II ferroelectric tester (Radiant Technologies, Inc., Albuquerque, N. Mex.) is used in combination with a Trek 10/10B-HS high-voltage amplifier (0-10 kV AC, Lockport, N.Y.). The applied voltage has a bipolar sinusoidal waveform in a frequency range of 0.1-1000 Hz. Gold electrodes (ca. 2.5 mm$^2$ diameter) with a thickness of approximately 25 nm are evaporated onto both sides of the film samples using an EvoVac Deposition System (Angstrom Engineering, Inc., Kitchener, ON, Canada). The metallized film samples are immersed in a silicone oil (Fisher 460-M3001) bath to avoid corona discharge in air. The temperature is controlled by an IKA RCT temperature controller (Wilmington, N.C.). A low temperature of 0° C. is achieved by cooling the silicone oil bath using a dry ice bath. A sample fixture is used for connecting the electrodes on both sides of the film to the interface of the Radiant ferroelectric tester using high voltage cables. The coercive field corresponds to the value of the applied electric field when the polarization is 0, on the hysteresis loop obtained with an electric field having a frequency of 10 Hz and a maximum magnitude of 150 MV/m.

The dielectric constant may be measured by broadband dielectric spectroscopy, using the following exemplary protocol: use is made of a Novocontrol Concept 80 broadband dielectric spectrometer (Montabaur, Germany) with temperature control. The applied voltage is 1.0 Vrms (root-mean square voltage) with frequency from 0.01 Hz to 10 MHz and temperature from −50° C. to 100° C. at a heating rate of 2° C./min. Gold electrodes are evaporated onto both surfaces of the films using a similar procedure as that for the D-E loop measurements. The electrode area is ca. 0.786 cm$^2$.

The Curie transition temperature may be determined either by differential scanning calorimetry or preferably from the above broadband dielectric spectroscopy measurement: it corresponds to the maximum peak of the dielectric constant as a function of temperature.

The glass transition temperature may be determined either by differential scanning calorimetry or preferably from the above broadband dielectric spectroscopy measurement.

The fluoropolymer object of the invention can be used to make an electronic device. In particular, the fluoropolymer film of the invention can be used as a layer in a multilayer arrangement in an electronic device.

Accordingly, the fluoropolymer object may be deposited or affixed to one or more surfaces, such as a glass, silicon, metal or polymer surface. One or more additional layers can be deposited on the fluoropolymer object, such as one or more polymer, or semi-conductive, or metal layers.

By "electronic device" is meant either a single electronic component, or a set of electronic components which may provide one or more functions in an electronic circuit.

In some variations, the electronic device is more particularly an optoelectronic device, i.e. may emit, detect or control electromagnetic radiation.

Examples of electronic devices, or optoelectronic devices, which can be made according to the invention are transistors, such as field effect transistors, electronic chips, batteries, photovoltaic cells, organic electroluminescent diodes, sensors, actuators, transformers, haptic devices, electromechanical systems and detectors.

The electronic and optoelectronic devices of the invention are used and integrated in various systems such as televisions, phones, rigid or flexible screens, photovoltaic modules, lightning sources, energy converters, electric energy storage systems, artificial muscles, electrocaloric cooling systems, etc.

EXAMPLES

The following examples illustrate the invention without limiting it.

Example 1—Synthesis of P(VDF-TrFE-HFP)

A statistical P(VDF-TrFE-HFP) random terpolymer was synthesized by suspension polymerization.

VDF (520 g, 8.13 mol), TrFE (358 g, 4.37 mol) and HFP (163 g, 1.09 mol) were transferred into a 3 L reactor containing deionized water (1784 g) and a hydroxypropylmethyl cellulose stabilizer, at room temperature. The reactor was heated up to 48° C., and then the radical initiator was added. The pressure inside the reactor was maintained between 80 and 100 bar by injection of deionized water. After the introduction of another 670 g of water, the polymerization was stopped by fast cooling of the reactor to 17° C. After degassing, the crude product was filtered and the resulting fine white powder was washed with deionized water. The final product was dried for 24 h at 60° C. in a ventilated oven (yield=68%). The final VDF/TrFE/HFP molar composition of 58/38/4 was determined by 19F nuclear magnetic resonance (NMR) spectroscopy. Based on SEC results in dimethylformamide, the Mn of the terpolymer was 153.2 kg·mol$^{-1}$ and the polydispersity index was 3.0.

Example 2—Film Processing

Films were obtained by hot-pressing various fluoropolymers. Powder samples sandwiched by two Kapton films were heated between unclosed hot platens at 190° C. for 10 min. Three cycles of degassing process were performed by repeated compression and release in order to avoid trapping air bubbles in the films. Then, a pressure of 4000 psi was quickly applied. After holding for 5 min, the samples were quenched into liquid nitrogen to prevent the formation of large crystallites. The resulting films were stretched using a uniaxial stretcher at room temperature (about 20° C.) at from 12 to 600 mm/min up to a 400% drawing ratio. The films undergo a post-processing thermal annealing step at 65° C. with fixed ends.

D-E hysteresis loops were measured according to the protocol described above. They are shown in FIG. 1, for (A) a comparative quenched P(VDF-TrFE) 50/50 copolymer, (B) the quenched P(VDF-TrFE-HFP) terpolymer made in example 1 and (C) the stretched P(VDF-TrFE-HFP) terpolymer obtained in the present example.

Figure 2:
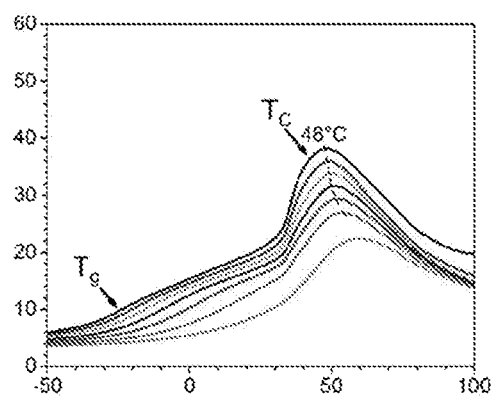
In FIG. 2, the dielectric constant of a polymer film according to the invention as a function of temperature is shown. The various curves were obtained using different frequencies, as set forth in detail in example 2 below. The dielectric constant is shown on the Y-axis and temperature in ° C. is shown on the X-axis.

The dielectric constant was measured on the stretched P(VDF-TrFE-HFP) terpolymer according to the protocol described above. The result as a function of temperature is shown on FIG. 2. The different curves, from top to bottom, were obtained at frequencies of respectively 1 Hz, 10 Hz, 100 Hz, 1 kHz, 10 kHz, 100 kHz and 1 MHz. The Curie transition temperature Tc was determined to be 48° C. at 1 Hz.

What is claimed is:

1. A method of making a fluoropolymer object, comprising:
   providing a substrate comprising fluoropolymer comprising units derived from monomers $M_1$, $M_2$ and $M_3$, wherein:
   $M_1$ is a vinylidene fluoride;
   $M_2$ is a monomer of formula (I): $CX_1X_2\!=\!CX_3X_4$, wherein each of $X_1$, $X_2$, $X_3$ and $X_4$ is independently selected from H, Cl and F, and wherein at least one of $X_1$, $X_2$, $X_3$ and $X_4$ is F;
   $M_3$ is a monomer of formula (II): $CY_1Y_2\!=\!CY_3CF_3$, wherein each of $Y_1$, $Y_2$ and $Y_3$ is independently selected from H, Cl, F, Br, I and alkyl groups comprising from 1 to 3 carbon atoms;
   stretching the substrate at a temperature higher than the Curie transition temperature of the fluoropolymer of the substrate; and
   wherein no thermal annealing is performed after stretching the substrate at a temperature higher than the Curie transition temperature of the fluoropolymer of the substrate.

2. The method of claim 1, wherein the fluoropolymer object is a fluoropolymer film or a fluoropolymer fiber.

3. The method of claim 1, wherein the substrate is stretched at a temperature from 20 to 120° C.

4. The method of claim 3, wherein the substrate is stretched at a temperature from 60 to 120° C.

5. The method of claim 1, wherein the substrate is stretched by at least 150%.

6. The method of claim 1, wherein the substrate is stretched in one direction.

7. The method of claim 6, wherein the substrate is stretched in two directions.

8. The method of claim 1, wherein $M_2$ is selected from the group of trifluoroethylene, tetrafluoroethylene, chlorotrifluoroethylene and 1,1-chlorofluoroethylene.

9. The method of claim 1, wherein each of $Y_1$, $Y_2$ and $Y_3$ is independently selected from H, Cl, F, Br and I.

10. The method of claim 1, wherein $M_3$ is selected from the group of hexafluoropropene, 3,3,3-trifluoropropene, 1,3,3,3-tetrafluoropropene, 2,3,3,3-tetrafluoropropene, 1-chloro-3,3,3-trifluoropropene and 2-chloro-3,3,3-trifluoropropene.

11. The method of claim 1, wherein the proportion of units derived from the $M_1$ monomers in the fluoropolymer is from 15 to 55 mol. %, relative to the total of units derived from the $M_1$ and $M_2$ monomers.

12. The method of claim 1, wherein the fluoropolymer comprises less than 15 mol. % of units derived from the $M_3$ monomers.

13. The method of claim 1, wherein providing the substrate comprises shaping the fluoropolymer into the substrate.

14. The method of claim 13, wherein shaping the fluoropolymer into the substrate comprises extruding or hot pressing the fluoropolymer into the substrate.

15. The method of claim 1, wherein providing the substrate comprises manufacturing the fluoropolymer by polymerizing monomers $M_1$, $M_2$ and $M_3$.

16. The method of claim 1, wherein the alkyl groups comprising from 1 to 3 carbon atoms are partially halogenated.

* * * * *